July 22, 1969     L. W. HELLER     3,456,496

DYNAMIC SOIL STRAIN GAGE SENSOR AND APPARATUS

Filed March 29, 1966     2 Sheets-Sheet 1

INVENTOR.
LYMAN W. HELLER

BY
ATTORNEY.

July 22, 1969 L. W. HELLER 3,456,496
DYNAMIC SOIL STRAIN GAGE SENSOR AND APPARATUS
Filed March 29, 1966 2 Sheets-Sheet 2

INVENTOR.
LYMAN W. HELLER
BY
ATTORNEY.

United States Patent Office 3,456,496
Patented July 22, 1969

---

3,456,496
DYNAMIC SOIL STRAIN GAGE SENSOR AND APPARATUS
Lyman W. Heller, Vicksburg, Miss., assignor to the United States of America as represented by the Secretary of the Navy
Filed Mar. 29, 1966, Ser. No. 538,922
Int. Cl. G01n 3/20, 33/24
U.S. Cl. 73—88.5                              3 Claims

ABSTRACT OF THE DISCLOSURE

The description discloses a strain gage apparatus for sensing the velocity and/or magnitude of dynamic strain which is propagated through soil. The apparatus may include a thin ribbon which is transversely flexible and is adapted to be disposed in the soil, and pairs of strain gages mounted on the ribbon at spaced intervals therealong with the strain gages of each pair being located on opposite sides of the ribbon in an oppositely disposed relationship. The ribbon may be disposed in the soil at an oblique angle with respect to the direction of the strain propagation so that the velocity of the strain propagation can be determined.

---

The invention decribed herein may be manufactured and used by or for the Government of the United States of America for governmental purposes without the payment of any royalties thereon and therefor.

It has been recognized that the best approach for protecting personnel from a nuclear explosion is to provide an underground habitable environment. This means that structures such as shelters, utility lines, communication lines, appurtenances, and so forth, of a sufficient scope to support man, must be constructed underground. A nuclear blast subjects the ground soil to a high dynamic strain in contrast to the static strain which is normally encountered from surface buildings. When a nuclear weapon is detonated there is propagated through the soil a shock wave which rapidly diminishes with depth. This shock wave can now be simulated by blast pits or tubes which utilize a normal explosive. In order to properly design underground structures the engineer must not only know the soil strain at various points in the ground, but must also know the velocity of propagation of the strain wave through the ground.

There is no known device which will determine or sense the velocity and magnitude of dynamic strain which is propagated through the ground, however several devices have been employed for the purpose of measuring the strain at a particular point within the ground. One such device has been the so-called "Spool Gage" which consists of a pair of spaced apart disc-shaped anchorages which are connected together by a smaller diameter motion sensing element. In this device the sensing element senses the relative motion between the two discs due to soil strain. Another device, which is called a "Coil Gage," consists of a pair of spaced apart axially oriented inductance coils. The relative movement between the two coils provides an indication of the soil strain therebetween. One serious shortcoming of both of these gages is that they do not sense soil strain at a point but only sense the average soil strain that occurs between the disc anchorages or coils. These gages cannot detect dynamic strain until the full gage length has been completely traversed by the propagating dynamic soil strain front. Accordingly, the dynamic strain at the point in question is only approximated. Another serious disadvantage of these gages is that they cannot sense the strain propagation velocity which results from the traveling shock wave within the soil.

The present invention provides a device and method of sensing and determining dynamic or static strain at a soil location which more closely approximates a point than the prior art devices. Further, the present device and method enables a determination of the average propagation velocity of the strain between various gage points within the soil. The soil strain at various points within the ground is sensed by a strain sensor which includes: a very thin flexible ribbon and pairs of strain gages which are mounted to the ribbon at spaced intervals therealong with the strain gages in each pair being located on opposite sides of the ribbon. This strain sensor is disposed within the ground with the ribbon at an angle with respect to the direction of the strain propagation. For all practical purposes, each pair of strain gages will sense the strain at a point within the soil since the time for the dynamic strain wave to engulf each pair of strain gages between the very thin ribbon is only a minute amount of time. As the shock wave propagates through the ground the pairs of strain gages will sense the bending strain of the ribbon at the various points therealong. I have found that there is a definite relationship between the bending strain of the ribbon and the soil strain at these various points so that the soil strain can be determined once the bending strain of the ribbon is known. In order to determine the average propagation velocity of the strain wave between the various gage points a time-strain recording device is connected to each pair of strain gages so that upon completion of the test the velocity of the strain wave through the ground can be determined.

An object of the present invention is to provide a soil strain gage sensor which will more nearly sense the strain at a point location within a body of soil;

Another object is to provide a soil strain gage sensor which is capable of sensing dynamic or static strain at successive depths within a body of soil;

A further object is to provide a soil strain gage apparatus for determining the dynamic strain at successive depths within the ground and the velocity of the strain wave between said depths;

Still another object of the present invention is to provide a method for determining dynamic strain at various depths underground and the velocity of the strain wave therebetween.

Other objects, advantages and novel features of the invention will become apparent from the following detailed description of the invention when considered in conjunction with the accompanying drawings wherein.

Figure 1:
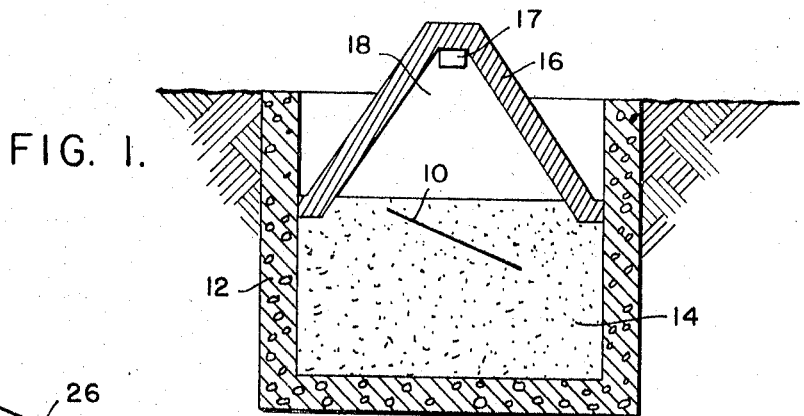
FIG. 1 is a cross-sectional elevation view of a blast pit with the strain gage sensor shown disposed in the soil to be tested.

Referring now to the drawings wherein like reference numerals designate like or similar parts throughout the several views, there is shown in FIG. 1 a soil strain gage sensor 10 which is disposed within a test pit 12. The test pit 12 contains a quantity of soil 14 which is to be tested, and includes a blast housing 16 which completely houses the surface of the soil. An explosive charge 17 is mounted at the top of the housing 16 and upon detonation will subject the quantity of soil 14 to a simulated nuclear blast wave. As the blast wave propagates downwardly within the soil 14, the soil is subjected to various strains which will be sensed by the strain gage sensor 10.

Figure 2:
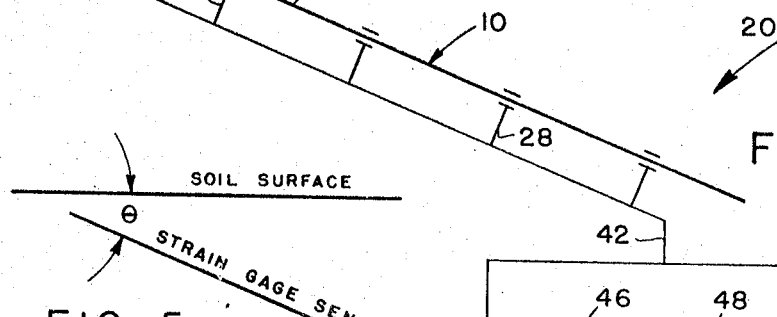
FIG. 2 is a schematic illustration of the strain gage apparatus.
Figure 5:
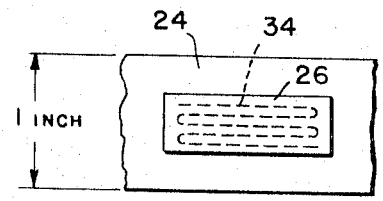
FIG. 5 is a schematic illustration of the angle at which the strain gage sensor is disposed with respect to a horizontal to measure a vertically propagating strain wave.
Figure 3:
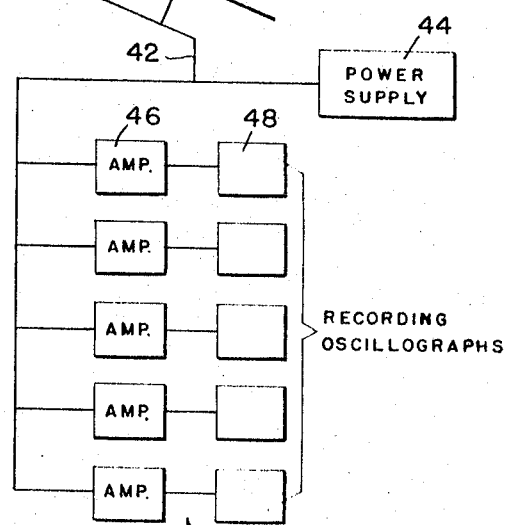
FIG. 3 is a top view of a portion of the strain gage sensor showing a top strain gage in place.
Figure 3A:
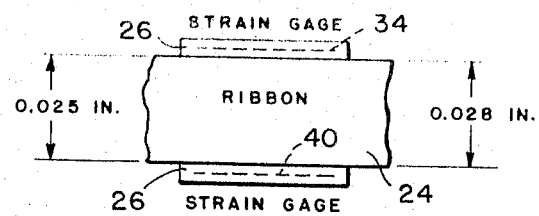
FIG. 3a is an enlarged edge view of a portion of the strain gage sensor with a pair of strain gages shown in place.

Shown in FIG. 2 is a soil strain gage apparatus 20 which includes the strain gage sensor 10 and recording circuitry 22. The strain gage sensor 10 includes a thin flexible ribbon 24 and pairs of strain gages 26 which are mounted to the ribbon 24 at spaced intervals therealong. As shown in FIGS. 2 and 3a, the strain gages 26 within each pair of strain gages are located on opposite sides of the ribbon. The ribbon 24 should be very thin so as to locate the strain gages in each pair as close together as possible and flexible so as to be highly responsive to the strain wave as the wave propagates downwardly within the soil 14. I have found that a ribbon 24 constructed of stainless steel which is one inch wide and .025″ in thickness serves these purposes.

The strain gages may be of the resistance type. The SR4A5 Baldwin-Lima-Hamilton strain gage has worked satisfactorily for the purposes of the invention. The strain gage 26 may be mounted to the ribbon 24 longitudinally by any suitable bonding material such as epoxy. The Baldwin-Lima-Hamilton type of strain gages have a paper back which when cemented to the ribbon 24 give an effective thickness of the ribbon of .028″, as shown in FIG. 3a. This effective thickness is used in explaining the theory of the invention, which theory is set forth in detail hereinbelow.

Upon the propagation of a strain wave through the soil 14 the ribbon 24 is subjected to successive bending strains. The bending strain of the ribbon at each pair of strain gages 26 will be sensed by that pair of strain gages. I have found that the bending strain of the ribbon at each pair of strain gages has a definite relationship to the surrounding soil strain so that upon sensing the bending strain of the ribbon the soil strain can be easily determined. This relationship is derived as follows:

$$E = \frac{\sigma}{\epsilon_r} \quad (1)$$

and $$\sigma = \frac{Mc}{I} \quad (2)$$

where

E = Modulus of elasticity of the ribbon
$\sigma$ = Stress of the ribbon
$\epsilon_r$ = Strain of ribbon
M = Moment
c = Distance from neutral axis to stress point and
I = Moment of inertia of the ribbon Therefore $$\sigma = E\epsilon_r = \frac{Mt/2}{I} \quad (3)$$

or $$\frac{M}{EI} = \frac{\epsilon_r}{t/2} \quad (4)$$

where t = effective thickness of the ribbon 24. Also $$\frac{M}{EI} = \frac{1}{\rho} \quad (5)$$

where $\rho$ = radius of curvature of the ribbon over a unit length of the ribbon so that $$\frac{1}{\rho} = \frac{\epsilon_r}{t/2} = \Delta\alpha \quad (6)$$

Figure 6:
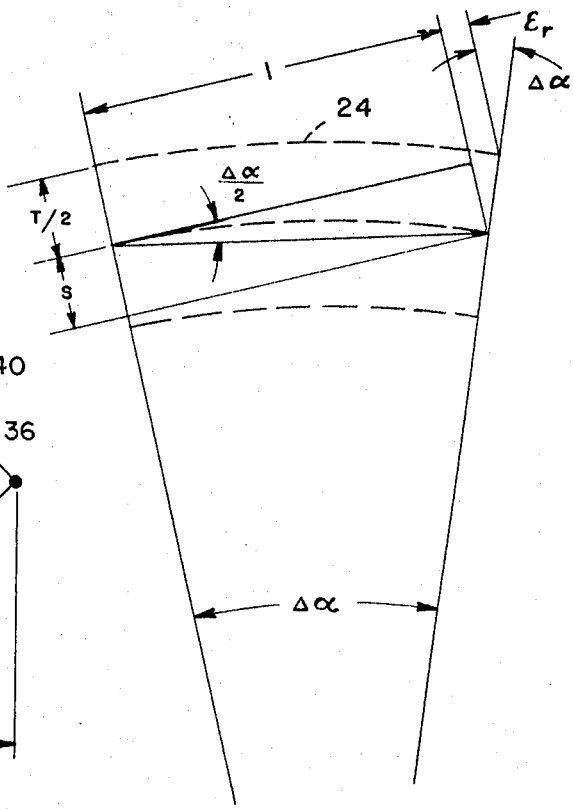
FIG. 6 is a schematic illustration of a unit length of the strain gage ribbon (shown in dotted lines) undergoing bending strain.

Letting 1 represent a unit length of the ribbon 24, as shown in FIG. 6.

$$\frac{\Delta\alpha}{2} = \frac{s}{1} \quad (7)$$

where s = The deflection of the unit length of ribbon

It follows that $$s = \frac{\epsilon_r}{t} \quad (8)$$

Figure 7:
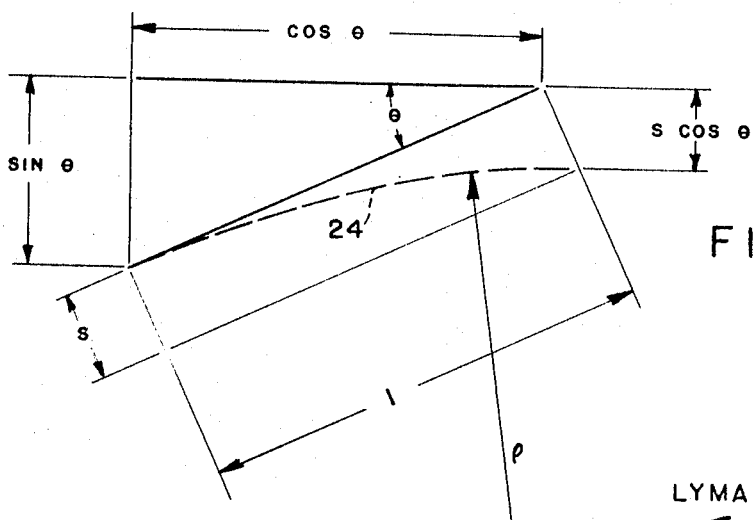
FIG. 7 is similar to FIG. 6 except the strain gage ribbon is represented by a single dotted line which corresponds to the neutral axis of the ribbon.

As shown by FIG. 7 the strain of the soil $$\epsilon_s = \frac{s \cos\theta}{\sin\theta} \quad (9)$$

or $$\epsilon_s = \epsilon_r \frac{\cot\theta}{t} \quad (10)$$

where $\theta$ = The angle of the ribbon 24 with respect to a horizontal

If the ribbon 24 has an effective thickness of .028 inch, as shown in FIG. 3a then $$\epsilon_s = 35.7\epsilon_r \cot\theta \quad (11)$$

Accordingly, when the bending strain of the ribbon and the angle $\theta$ that the ribbon takes with respect to a horizontal are known, the strain of the soil $\epsilon_s$ can be determined from Formula 11. Because of the close proximity of the strain gages of each pair the measured bending strain of the ribbon 24 is related for all pratical purposes to soil strain at a point location. The strain determined by Formula 11 is the vertical strain of the soil at the point in question.

It is to be noted that upon propagation of the blast wave downwardly within the soil 14 that the ribbon 24 is not only subjected to bending strain but is also subjected to a strain due to compression. The compressive strain introduces an error and has no relationship with respect to the strain of the surrounding soil. By utilizing pairs of strain gages 26, however, this error has been overcome since the location of the strain gages of each pair on opposite sides of the ribbon 24 in an opposing relationship causes this compressive strain to be canceled out in the recording circuitry 22 of FIG. 2.

In running a test to determine the strain of the soil 14 at various depths it is desirable to determine the velocity of the strain wave as it propagates downwardly through the soil 14. This is the reason why a plurality of pairs of strain gages 26 are employed and the ribbon is disposed at an angle $\theta$ with respect to a horizontal. In order to record the strains sensed by the pairs of strain gages 26 and relate these strains to time, the recording circuitry 22, as shown in FIG. 2, is employed.

Figure 4:
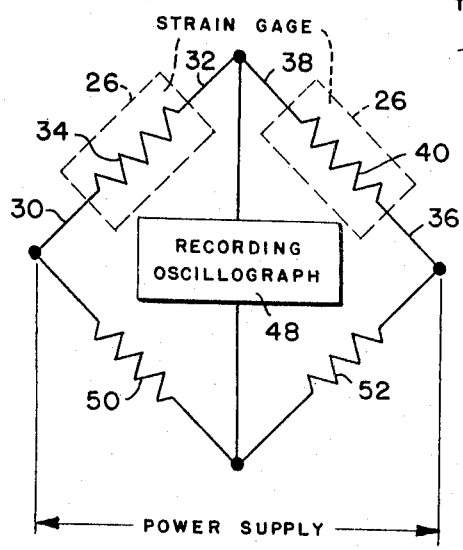
FIG. 4 is a schematic illustration of the connection of a pair of strain gages to other electrical circuitry.

Each of the lines 28, as shown in FIG. 2, represents two pairs of leads, each pair of leads being connected to a respective resistive element of a strain gage. The pairs of leads are represented in FIG. 4 wherein one pair of leads 30 and 32 are connected to a resistive element 34 of one of the strain gages 26 and one pair of leads 36 and 38 are connected to a resistive element 40 of the other strain gage 26. As shown in FIG. 2, a line 42, which represents all of the pairs of leads from the strain gages 26, is connected to a power supply 44 and the recording circuitry 22. In the recording circuitry 22 the pairs of leads from each respective pair of strain gages 26 is connected to a respective amplifier 46 and a respective recording instrument such as a recording oscillograph 48. The recording oscillograph 48 may record directly the strain sensed by a respective pair of strain gages 26 and plot this strain as a function of time. A single multichannel oscillograph may be used.

Each amplifier 46 not only amplifies the signal from the respective pair of strain gages 26 but also includes a pair of resistors 50 and 52 which are connected to a respective pair of the resistive elements of the strain gages 26 to form a bridge circuit, as shown in FIG. 4. The power supply 44 is connected across one pair of terminals of the bridge circuit while the recording oscillograph 48 is connected across an opposite pair of terminals of the bridge circuit. Accordingly, when a pair of the strain gages 26 senses a bending strain within the ribbon 24 the resistive elements 34 and 40 of the strain gages cause an imbalanced condition in the bridge circuit resulting in a corresponding signal to be fed to the recording oscillograph 48.

In calibrating the strain gages 26 in a two active arm bridge circuit, as shown in FIG. 4, for use with the recording oscillograph 48 a known resistance is introduced across one of the resistive elements of a strain gage and readings are taken on a strain indicator (not shown) and the recording oscillograph 48. The strain indicated on the strain indicator is then compared with the deflection of the oscillograph trace on the recording oscillograph 48 for this same resistance change. By this means, a calibration factor in units of micro-inches per inch per inch of trace deflection is obtained for the bridge circuit. For instance, when a 100,000 ohm resistance change was introduced across one of the resistive elements of a strain gage, a strain of 610 micro-inches per inch was indicated on the strain indicator. When the 100,000 ohm resistance change was introduced in the oscillograph circuit the trace deflection was measured and the direction of movement was noted. With this arrangement the calibration factor is $$\text{C.F.} = \frac{610}{2} \times \frac{1}{3} \times \frac{1}{\text{Trace Deflection}}$$

In practicing the method of the present invention to determine the velocity of the strain propagation within the soil, the ribbon 24 along with the pairs of strain gages 26 are disposed within the soil 14 with the ribbon at an angle $\theta$ with respect to a horizontal. The soil 14 is dynamically loaded by detonating the explosive charge 17 within the test pit housing 16 and the strain indications of the pairs of strain gages 26 are recorded by the recording oscillographs 48. The recording oscillographs 48 can be properly marked to indicate directly the strain within the soil or alternatively, the bending strain of the ribbon 24. If the bending strain is indicated the soil strain can be easily determined from Formula 11 above. Since the soil depth of the ribbon 24 will be known for each pair of strain gages 26, the invention provides a time-depth-strain relationship at the various soil point locations.

It is now readily apparent that the present invention provides a very simple device and method for determining soil strain as near to a point as possible as well as enabling a determination of the velocity of a strain wave within the soil media.

Obviously many modifications and variations of the present invention are possible in the light of the above teachings. It is therefore to be understood that within the scope of the appended claims the invention may be practiced otherwise than as specifically described.

I claim:
1. A method of enabling measurement of the velocity of strain propagation in soil due to dynamic loading comprising the steps of:
    disposing a transversely flexible ribbon, which has pairs of strain gages mounted at spaced intervals therealong with the strain gages of each pair being located on opposite sides of the ribbon in an oppositely disposed relationship, in the soil with the ribbon at an angle with respect to a horizontal;
    dynamically loading said soil; and
    recording the strain indications of said strain gages as a function of time
whereby the strain propagated in the soil can be determined according to the formula

$$\epsilon_s = \epsilon_r \frac{\cot \theta}{t}$$

$\epsilon_s$=Soil strain
$\epsilon_r$=Bending strain of ribbon
$\theta$=Angle of ribbon with respect to a horizontal and
$t$=Thickness of ribbon.

2. For use in a blast test pit, formed of an enclosed quantity of soil, and having an energy source disposed above the soil surface in position for subjecting said soil to a simulated nuclear blast wave, a dynamic strain gage sensor comprising a thin metallic ribbon which is transversely flexible and adapted to be disposed in the soil at an angle to the horizontal plane; pairs of strain gages mounted on the ribbon at spaced intervals therealong, to provide for progressively sensing bending strains produced by said blast wave, the strain gages of each pair being located on opposite sides of said ribbon in an oppositely disposed relationship to provide for the cancellation of compression strains on said ribbon, whereby a time-strain record of the bending strains at said gage locations can be made.

3. A dynamic soil strain gage sensor as claimed in claim 2 wherein:
    the ribbon is constructed of stainless steel;
    said ribbon has a thickness of approximately .025"; and
    including:
    a series of bridge circuits wherein each pair of strain gages form a pair of adjacent legs of a respective one of said bridge circuits;
        a recording oscillograph connected across each respective bridge circuit; and
        means connected to the strain gages for recording strain as a function of time.

References Cited

UNITED STATES PATENTS

| 3,286,513 | 11/1966 | Wasiotynski | 73—88.5 |
| 3,295,377 | 1/1967 | Richard | 73—88.5 X |
| 2,563,425 | 8/1951 | Schaevitz | 73—88.5 |

FOREIGN PATENTS

| 47,055 | 6/1963 | Poland. |
| 262,587 | 10/1949 | Sweden. |
| 1,296,947 | 5/1962 | France. |

RICHARD C. QUEISSER, Primary Examiner

J. WHALEN, Assistant Examiner

U.S. Cl. X.R.
73—88, 100; 338—2